(12) United States Patent
Bresser et al.

(10) Patent No.: US 8,821,023 B2
(45) Date of Patent: Sep. 2, 2014

(54) DIRT GROOVES IN LUBRICATED SLIDING BEARINGS

(75) Inventors: Karsten Bresser, Eltville (DE); Stefan Rittmann, Kirchheimbolanden (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 0 days.

(21) Appl. No.: 13/820,262

(22) PCT Filed: Sep. 2, 2011

(86) PCT No.: PCT/EP2011/065194
§ 371 (c)(1),
(2), (4) Date: May 14, 2013

(87) PCT Pub. No.: WO2012/028715
PCT Pub. Date: Mar. 8, 2012

(65) Prior Publication Data
US 2013/0223777 A1    Aug. 29, 2013

(30) Foreign Application Priority Data

Sep. 2, 2010    (DE) .......................... 10 2010 040 156

(51) Int. Cl.
*F16C 33/10*    (2006.01)
*F16C 33/02*    (2006.01)

(52) U.S. Cl.
CPC ................. *F16C 33/02* (2013.01); *F16C 33/10* (2013.01); *F16C 33/105* (2013.01); *F16C 33/1065* (2013.01)
USPC .......................................... 384/292; 384/288

(58) Field of Classification Search
USPC .................................. 384/288, 291, 292, 322
See application file for complete search history.

(56) References Cited

U.S. PATENT DOCUMENTS

| | | | | | |
|---|---|---|---|---|---|
| 3,552,807 | A | * | 1/1971 | Blount | 384/122 |
| 4,105,267 | A | * | 8/1978 | Mori | 384/291 |
| 6,729,763 | B2 | * | 5/2004 | Post et al. | 384/213 |
| 2001/0048780 | A1 | * | 12/2001 | Markovitch | 384/291 |
| 2003/0156769 | A1 | * | 8/2003 | Whang | 384/291 |
| 2004/0066992 | A1 | | 4/2004 | Shih et al. | |
| 2009/0067766 | A1 | | 3/2009 | Maruyama et al. | |

FOREIGN PATENT DOCUMENTS

| | | | |
|---|---|---|---|
| CA | 1 183 721 A1 | 3/1985 | |
| DE | 21 42 031 A1 | 2/1973 | |
| DE | 3905450 C2 | 8/1989 | |
| DE | 10156344 A1 | 5/2002 | |
| GB | 1128370 A | 9/1968 | |
| JP | 55 012180 U | 1/1980 | |
| JP | 2004 060757 A | 2/2004 | |
| JP | 2004244177 A * | 9/2004 | B66F 9/08 |

\* cited by examiner

*Primary Examiner* — Phillip A Johnson
(74) *Attorney, Agent, or Firm* — Robert L. Stearns Dickinson Wright, PLLC

(57) ABSTRACT

A lubricated plain bearing having at least one dirt guide groove formed on the sliding surface, which dirt guide groove extends at least partially to a greater extent in the circumferential direction of the bearing shell than in the axial direction of a shaft mounted therein, extends as far as an edge of the bearing and is open at the edge, such that dirt particles transported by the dirt guide groove to the edge can be discharged to the outside.

8 Claims, 2 Drawing Sheets

DIRT GROOVES IN LUBRICATED SLIDING BEARINGS

TECHNICAL FIELD

The invention relates to lubricated sliding bearings having at least one groove formed on the sliding surface, which extends to the edge of the bearing and is open at the edge.

RELATED ART

The sliding surfaces of sliding bearings are profiled for various reasons. For example, in DE 39 05 450 C2 it was proposed to provide sliding bearings with grooves that are filled with a soft material so that the harder material alternates with the softer material in the sliding surface in order to achieve a better wear resistance and fatigue strength.

GB 1,128,370 A describes a lubricant-free bearing in which recesses are formed in the sliding surface in the form of grooves or pockets to convey dirt particles out of the bearing. Foreign bodies that penetrate into the bearing are collected in the recesses and are transported in the direction of rotation of the shaft along the flanks of the recesses and conveyed out of the bearing at the ends of the bearing.

DE 101 56 344 A1 describes a bearing element that has an oil groove on the sliding surface, which extends in the circumferential direction. Plural narrow grooves are formed on the sliding surface at a specific angle as regards the rotational direction of the shaft from the oil groove to the axial end side of the sliding surface to guide lubricating oil from the oil groove during the circumferential movement of the shaft from the inside to the axial end side.

Sliding bearings in internal combustion engines are the subject of continuous further development. Continuously greater stress is occurring in internal combustion engines and therefore also in sliding bearings. At the same time, the size of engines is being reduced. Moreover, ever thinner oils are being used to reduce friction. This results in that the thickness of the lubricating films which prevent contact between the bearing and the shaft is constantly becoming less.

Furthermore, the structure of the bearing shell is changing. Lead, that has very good sliding properties, is being replaced by other elements. The stress capacity of the bearing is also being increased, and this is resulting in a greater susceptibility to external influences. Layers that withstand great stress are as a rule thinner and harder than conventional layers and this entails a lesser embeddability, i.e. the capability to embed hard particles into the sliding surface to reduce wear. By substituting lead-containing layers, the remaining slidability of a damaged layer is also reduced. The substrate of lead-free materials is as a rule also harder than conventional lead-bronze materials. This also reduces the embeddability, with the consequentially reduced operational safety of the bearing. If there is an intrusion of particles, the bearing will therefore be damaged to a greater extent than hitherto, and this can result in a total failure of the tribo-system. Foreign particles can have various origins and can reach the oil circuit in different ways. For example, the particles can stem from original dirt or be the result of the production of component production (borings from the production of piston walls, welding and soldering residue from the production of oil coolers, residual dirt of individual components from the packaging, etc.), they can also reach the oil circuit during maintenance work (change of oil) or can consist of residues from combustion (clodded, uncombusted hydrocarbon compounds) or wear particles (for example from the oil pump or from chain tensioners).

The foreign bodies can be many times larger than the bearing clearance. These are then not just simply washed out of the bearing shell. They move in the direction of the oil flow towards the end of the oil discharge bore, with the discharge of the foreign body being hindered by the bearing. Thus, these are pulled over the susceptible sliding surface and destroy the bearing by formation of scoring.

In extreme cases, the foreign body tries to leave the bearing in the area of least resistance, i.e. in the area of exposure (the greatest width of the gap), and is carried as a consequence of the wedge effect between the shaft and exposure by the shaft up until deep into the stressed areas of the bearing.

SUMMARY OF THE INVENTION

It is the object of the present invention to reduce the susceptibility of a lubricated bearing as regards the impact of foreign particles.

The sliding bearing according to the invention comprises at least one groove formed on the sliding surface, which extends at least in part more in the circumferential direction of the bearing shell than in the axial direction of a shaft mounted therein. Even where mention is made below of a dirt guiding groove, plural dirt guiding grooves can be provided. The inclination of the dirt guiding groove with a preferred extension in the circumferential direction causes an effective transportation of foreign particles owing to the oil-flow direction and the rotation of a shaft mounted in the bearing shell. For this reason, the one or plural dirt guiding grooves is/are embedded preferably in the rotational direction. In order to effectively wash the dirt out of the bearing and to avoid damage to the bearing owing to the foreign particles, the dirt guiding groove extends up to an edge of the bearing, i.e. up to one of two edges in axial direction of a shaft mounted in the bearing, and this is open at the edge. The dirt particles that are transported by the dirt guiding groove to the edge can thus be discharged to the outside. The dirt that is discharged in this manner arrives in the oil sump and is filtered during the next pumping cycle for example through a filter and out of the oil flow. The dirt guiding grooves can be incorporated by embossing, punching, screwing in, etc. into the sliding surface of the lubricated sliding bearing. Furthermore, the dirt guiding grooves can vary as regards their length, width, depth, geometry and position, by which an adaption to the distribution of form and size of dirt particles occurring can be undertaken. With the incorporated dirt guiding grooves, the particles damage at the most the surface up to the next closest dirt guiding groove and are then transported to the outside by the dirt guiding groove. By this damaged surfaces are reduced and the probability of failure of the bearing is drastically reduced. Furthermore, the lubricant in the dirt guiding groove helps to transfer temperatures out from the critical zones when there are high proportions of mixed friction (body contact friction>liquid friction) and reduces the coefficient of friction by its lubricating effect. This effect can reduce failure by the bearing by thermal seizure.

Preferably the dirt guiding groove is up to 80 µm deep in order to allow collection and transportation away of particles without an excessive reduction of the integrity of the sliding surface. For the same reason, the dirt guiding groove is preferably up to 150 µm wide. Of course, plural dirt guiding grooves can have these or other properties of preferred embodiments. In particular, should there be plural dirt guiding grooves, different dimensions can be provided to take into account the different types of dirt. Furthermore a dirt guiding groove can vary along its extension as regards its width and/or depth and/or its cross-section.

Preferably at least two dirt guiding grooves are formed in the axial direction, one next to the other, at inclinations facing in different directions. The spacing, the number as well as the angle of the dirt guiding grooves can vary here. The hydrodynamic impact of the dirt guiding grooves can be reduced by the inclined arrangement of the dirt guiding grooves towards the shaft running direction. For this reason and in order to avoid a one-sided stress, a symmetrical arrangement of the grooves is preferred should there be plural dirt guiding grooves. In particular, the axis is to be considered as the symmetry axis that has no axial components and extends in the centre of the sliding surface.

Preferably a centre groove is provided that is characterized in that it does not have any axial components. The centre groove can be closed around its circumference or on both sides. The centre groove also communicates with at least one of the dirt guiding grooves. Transportation of dirt particles in the circumferential direction is effected by the centre groove in order to transport the dirt particles to a dirt guiding groove that thereafter undertakes to convey the particles to the outside. It is preferred here that the centre groove transports the foreign particles first out of a high stress area of the bearing into lesser stress areas, for example in the exposure areas that are preferably provided before the dirt particles are discharged to the outside. An exposure area is understood to be an area at the bearing ends of a bearing shell which forms the bearing in that the wall strength of the bearing shell is reduced as compared to the wall strength of the remainder of the bearing shell. By this means, the wear on one of the shafts running in the bearing shell owing to the inexactness at the connecting points of the two bearing shells can be reduced. The transportation through a centre groove can be carried out in the less stressed lid shell of a bearing shell in which one or plural dirt guiding grooves are provided for the transportation out. Plural centre grooves can be provided. Preferably the centre groove extends in the middle of the sliding surface, i.e. on the symmetrical axis defined above.

Preferably two dirt guiding grooves are arranged in a V. The two dirt guiding grooves extend outwardly from a joint starting point in the area of the bearing that is centre to the axial direction in a respective opposite axial direction. The inclination is preferably symmetrical.

Preferably two pairs of dirt guiding grooves, each arranged in 2 Vs, are provided which, as described above, extend outwardly each in opposite axial direction from a joint starting point in the area of the bearing that is centre in axial direction, with the two starting points being connected by a centre groove. Such an arrangement is suitable, for example, for a lubricated sliding bearing without a defined rotational direction when the two Vs are formed to be opposite in the circumferential direction.

Preferably the dirt guiding grooves arranged in a V are in low-stress areas of the bearing, i.e. in particular in the exposure areas, where these are provided.

Preferably at least one dirt guiding groove is curved so as to minimize the impact of the groove on the hydrodynamic properties of the bearing.

Preferably at least two dirt guiding grooves intersect, by which an exchange between the dirt guiding grooves of dirt particles can take place.

Preferably 10 to 20 dirt guiding grooves are provided, by which a more effective transportation off of dirt is achieved.

Preferably the cross-section of a dirt guiding groove and/or a centre groove is semicircular or rectangular.

Preferably the sliding surface is a connecting-rod bearing where a high degree of reliability against failure is to be ensured.

Preferably plural dirt guiding grooves are formed in a specific area of the sliding surface, in particular in groups, with a differently aligned inclination. The grouping can take place, for example, in view of the distribution of stress on the sliding surface or the hydrodynamic impact of the grooves on the sliding bearing.

The incorporation of dirt guiding grooves can take place by lasering, embossing or rolling. By this means the sliding surface can be profiled with only minor additional effort. To simplify production, the dirt guiding groove is formed preferably during a final processing step or before further coating procedures.

Preferably the dirt guiding groove is formed directly in a sliding layer of the sliding surface so as to reduce the area damaged by the formation of scoring in the stress area of the bearing. The structuring when there are three-material layers can be incorporated into the substrate material (for example bronze) in the last work step or before further coating procedures. When there are two-material bearings (for example aluminium), the dirt guiding groove is incorporated preferably directly into the sliding layer.

Preferably any eruptions and/or burrs and/or bars in the environment of the dirt guiding groove are removed after formation of the dirt guiding groove in order to improve the quality of the sliding area.

BRIEF DESCRIPTION OF THE DRAWINGS

The FIGS. 1 through 6 are each top views of unwound sliding surfaces of lubricated sliding bearings with dirt guiding grooves.

DETAILED DESCRIPTION

The FIGS. 1 through 6 are top views of an unwound sliding surface 1' of a bearing shell 1. In the sliding surface 1' grooves 20 are incorporated that act as dirt guiding grooves for the transportation to the outside of foreign particles.

Figure 3:
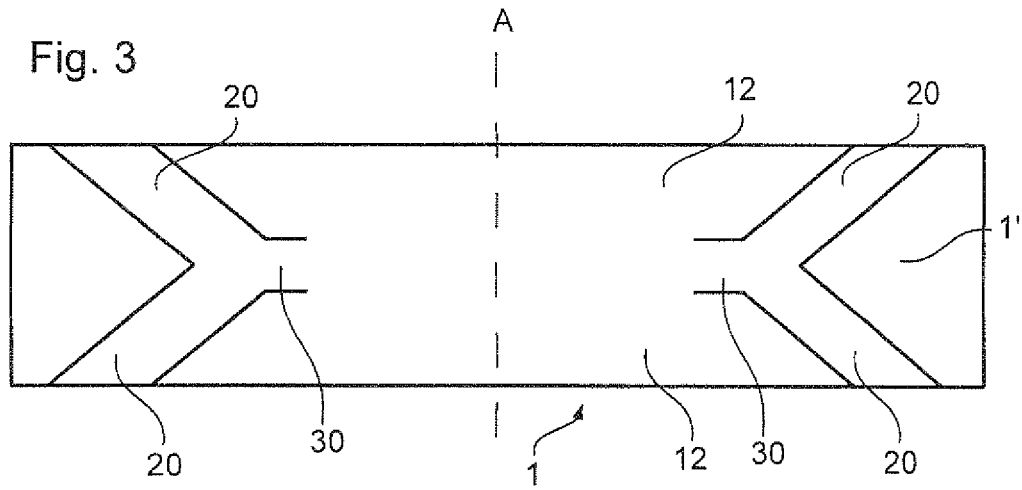
Figure 4:
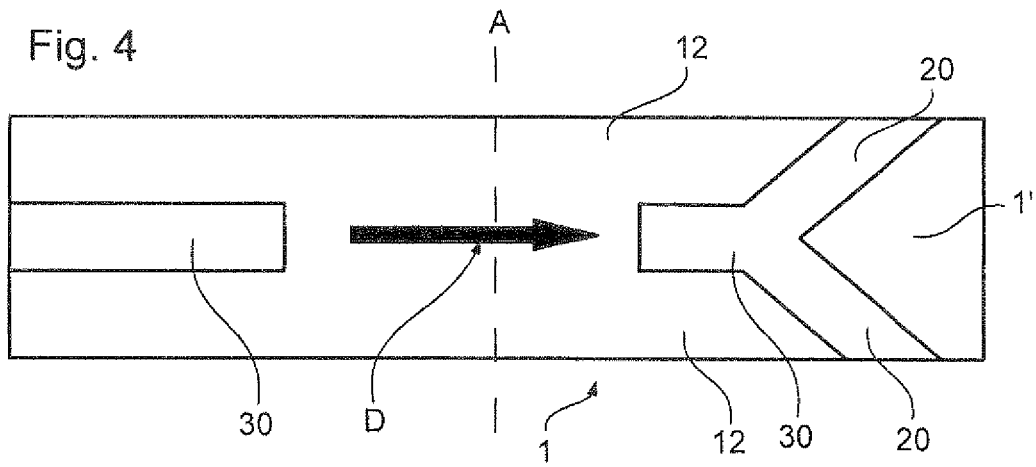
Figure 5:
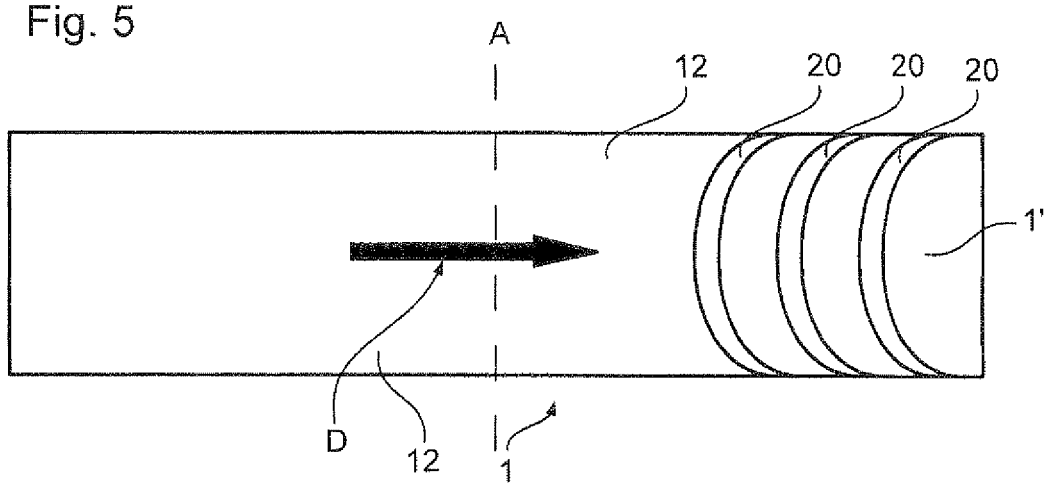
Figure 6:
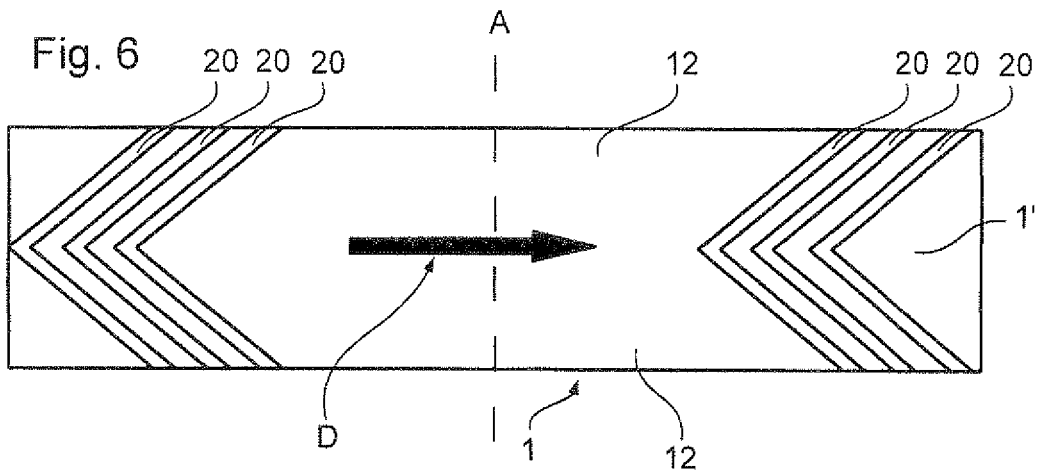

In the FIGS. 1, 2, 3, 4 and 6, the dirt guiding grooves 20 are formed as straight grooves and are inclined more greatly in the circumferential direction of the bearing shell than in the axial direction of a shaft provided in the bearing. The axial direction is shown using a dashed line A. In FIG. 5 the dirt guiding grooves 20 are curved and are inclined more greatly at least in the edge areas 12 of the bearing shell 1 in the circumferential direction than in the axial direction A.

In the projections shown, the circumferential direction of the bearing shell coincides with the rotational direction D shown in FIGS. 2, 4, 5 and 6. In the examples of these figures, the arrangement of the dirt guiding grooves 20 is dependent on the rotational direction of the shaft, in contrast to which the embodiment examples of FIGS. 1 and 3 are suited for a bearing shell without a defined rotational direction.

The dirt guiding grooves 20 contribute to the profiling of the sliding surface 1'. Two bearing shells 1 form each one bearing, where similar or different bearing shells 1 profiled with dirt guiding grooves 20 can be combined for the production of a bearing.

The dirt guiding grooves 20 each project beyond the lateral edge 12 of the bearing shell 1 in order to transport to the outside dirt particles that are between the bearing shell and shaft. In FIGS. 1 and 3, two pairs of dirt guiding grooves 20 each arranged in a V shape are provided symmetrically relative to an axis that does not have any axial components and extends in the centre of the sliding surface, i.e. it coincides with the arrow D. In FIG. 4 a V-shaped arrangement of two dirt guiding grooves 20 is shown.

Figure 1:
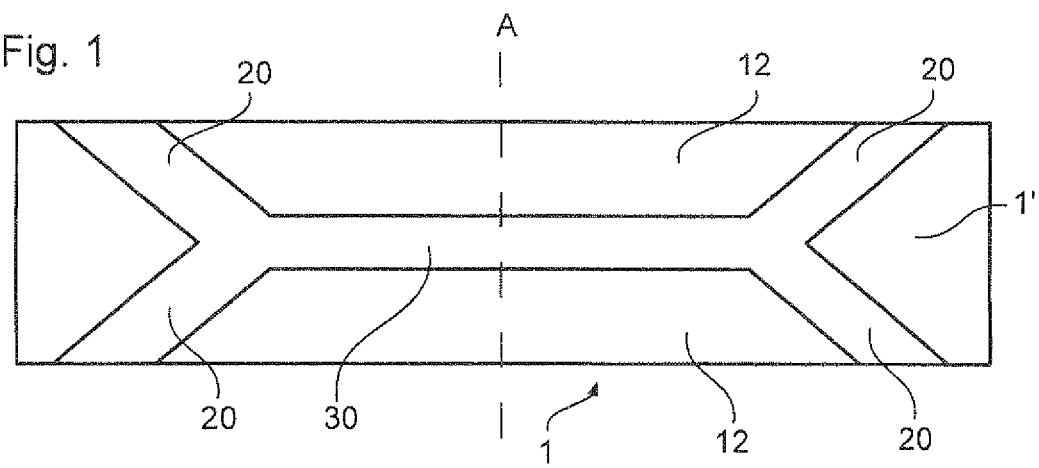
Figure 2:
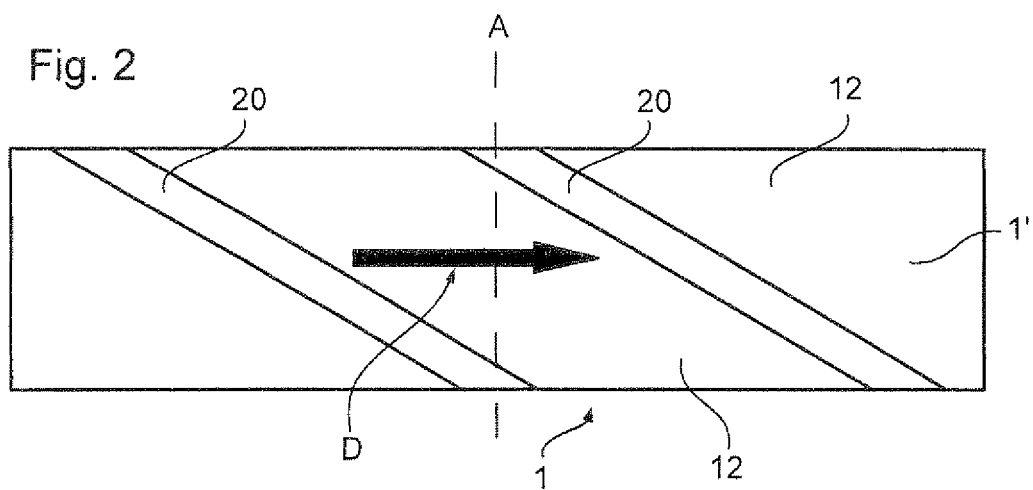

In FIG. 1 the two angular points of the Vs are connected by a centre groove 30 that extends in the circumferential direction of the bearing shell in order to ensure a quick supply of the dirt particles into the dirt guiding grooves 20. A supply of the dirt particles through the centre groove 30 to the V is also shown in FIG. 3 with the help of two centre grooves 30. A further arrangement with centre grooves 30 is shown in FIG. 4. In the embodiment examples with one or two centre grooves 30, the centre grooves 30 are equipped with closed ends or ends opening up into the dirt guiding grooves 20. The centre grooves 30 can, however, also be formed as continuous circumferential grooves. Furthermore, plural centre grooves 30 can be provided at different axial positions.

A V-shaped arrangement of dirt guiding grooves 20 that differs from the dirt guiding grooves 20 arranged in a V shape as shown above is shown in FIG. 6, where V grooves are provided in groups and a total of two groups with plural dirt guiding grooves 20 are incorporated in the sliding surface 1'.

The invention claimed is:

1. A lubricated sliding bearing having at least two pairs of dirt guiding grooves formed on the sliding surface, which extends at least in part more in the circumferential direction of a bearing shell than in the axial direction of a shaft mounted therein, extends up to an edge of the bearing and is open at the edge so that dirt particles that are transported by the dirt guiding grooves to the edge can be transported to the outside, wherein in addition, a centre groove that does not have any axial components and each pair of dirt guiding grooves arranged in opposite axial direction as V shaped grooves are provided in the circumferential direction, each pair of dirt guiding grooves extend outwardly from a respective joint starting point in an opposite axial direction in the area of the bearing that is the centre in the axial direction in the area of the bearing that is centre in the axial direction, the center groove being connected with the respective joint starting point of each pair of dirt guiding grooves.

2. A sliding bearing according to claim 1, wherein the dirt guiding groove is up to 80 μm deep.

3. A sliding bearing according to claim 1 wherein
the dirt guiding groove is up to 150 μm wide.

4. A sliding bearing according to claim 1, wherein at least two dirt guiding grooves are formed in the axial direction one next to the other having an inclination in different directions.

5. A sliding bearing according to claim 1, wherein the at least one dirt guiding groove is curved.

6. A sliding bearing according to claim 1, wherein the at least two dirt guiding grooves intersect.

7. A sliding bearing according to claim 1, wherein 10 to 20 dirt guiding grooves are provided.

8. A sliding bearing according to claim 1, wherein the sliding bearing is a connecting-rod bearing.

* * * * *